United States Patent Office 3,336,388
Patented Aug. 15, 1967

3,336,388
PREPARATION OF ANHYDROUS AMINE OXIDES
Garson P. Shulman, Baltimore, Md., assignor to Archer-Daniels-Midland Company, Minneapolis, Minn., a corporation of Delaware
No Drawing. Filed Jan. 20, 1964, Ser. No. 338,627
9 Claims. (Cl. 260—583)

This invention relates to the preparation of amine oxides. More particularly this invention relates to the preparation of anhydrous mixed alkyl tertiary amine oxides by oxidation of tertiary alkyl amines with ozone.

Amine oxides have been known and studies since about the end of the 19th century. Recently, interest in amine oxides has increased because of the finding that certain of these compounds are useful as detergents and foam stabilizers. Fatty amine oxides are of special interest because of their good surface active properties in addition to being bio-degradable.

Certain amine oxides may be prepared according to known procedures by the oxidation of amines using hydrogen peroxide as the oxidizing agent. Many studies have been made relating to the concentration of amine oxides, the reaction medium and reaction rates at various temperatures. The formation of amine oxides using hydrogen peroxide results in a hydrate form both because the reaction is normally carried out in an aqueous solution and because water is formed during the reaction from the decomposition of hydrogen peroxide. Amine oxides are very hygroscopic and as a result anhydrous amine oxides cannot readily be formed by this procedure.

Recently, it has been discovered that anhydrous amine oxides can be formed from the hydrate form by vacuum drying over phosphorus pentaoxide. This method is, however, an indirect route.

Attempts have previously been made to form amine oxides from tertiary amines using ozone as the source of the oxidizing agent. Such attempts resulted in amine oxides in admixture with numerous other oxidation products which were difficult to separate. In addition, the formation of amine oxides by reaction with ozone, was limited to short chain alkyl tertiary amines where all the alkyl groups were the same, e.g., trimethylamine.

The present invention provides a novel method of direct synthesis to anhydrous mixed alkyl tertiary amine oxides. It is therefore an object of this invention to provide a means of forming anhydrous mixed alkyl tertiary amine oxides. It is another object of this invention to utilize ozone as the oxidizing agent. It is a further object of this invention to utilize alkali or alkaline earth carbonate salts to increase the yield of the amine oxides and limit side reactions. It is yet another object of this invention to provide a method of producing anhydrous tertiary amine oxides having dissimilar alkyl groups by reaction with ozone. It is yet a further object of this invention to provide a means of obtaining high yields of anhydrous mixed alkyl tertiary amine oxides with a minimum of contamination by amine salts, carboxylic acids and amides.

The objects of this invention are accomplished by the process which comprises reacting mixed alkyl tertiary amines with ozone at a temperature range of about $-80°$ C. to about $-25°$ C.

The invention is primarily concerned with the formation of tertiary amine oxides wherein at least one of the alkyl groups is different than the other alkyl groups. In particular, the process of the invention involves the formation of tertiary amine oxides containing a long chain alkyl group as follows:

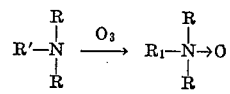

wherein R is a lower alkyl group such as methyl or ethyl and R' is an alkyl group of 10 to 18 carbon atoms. The preferred long chain alkyl group is lauryl. Examples of the preferred tertiary amine oxides produced by the process of the invention are dimethylcaprylamine oxide, dimethyllaurylamine oxides, dimethylmyristylamine oxide, dimethylpalmitylamine oxide and dimethylstearylamine oxide.

As used herein, the term mixed alkyl denotes that the tertiary amine or the tertiary amine oxide contains at least one alkyl group that is different than the remaining alkyl groups. The alkyl group may be a branched chain. However, branched chain groups are generally less desirable for certain uses of the tertiary amine oxides since they are usually not considered to be bio-degradable.

In the reaction of ozone with a tertiary amine, ozone may attack either the nitrogen atom or an alpha carbon atom, the desired reaction being the attack of the nitrogen atom. The reaction, however, will also readily form undesirable byproducts by attack on an alpha carbon atom as follows:

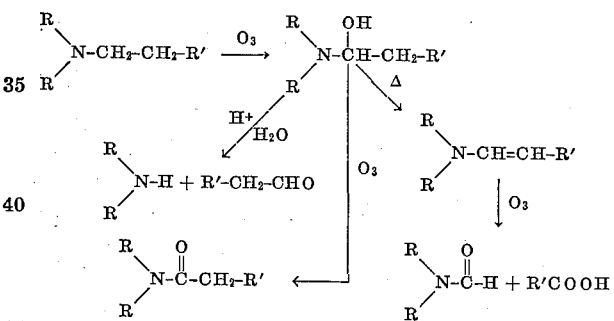

where R is a lower alkyl group such as methyl or ethyl and R' is an alkyl group of 8 to 16 carbon atoms. It has been found in this invention that the purity and yield of amine oxide can be regulated by the methods and processes of this invention.

In utilizing the process of this invention, it is common to obtain yields up to about 85% anhydrous tertiary amine oxide. The remaining portion is amine hydrochloride salt which normally need not be separated for most uses. If desired, it is readily separable from the oxide. The yield and purity of the product is directly related to the reaction temperature. The best yields are obtainable at the lower temperatures. At higher temperatures, the formation of amides predominates over amine oxide formation and are not desired. This, however, can be avoided by reacting within the preferred temperature ranges and utilizing alkali metal or alkaline earth metal salts to inhibit the formation of such undesirable impurities.

The yield of amine oxide is increased and the formation of the less desirable amine salts is decreased by using alkali metal or alkaline earth metal salts in about a molar equivalent to the tertiary amine. The amount used is not critical but an amount equal to about 0.8 to about 1.5 mol equivalents based on the amine is preferred. The preferred salts are the alkali metal or alkaline earth metal salts of weak acids, especially the carbonate salt of sodium, magnesium, potassium and calcium. Sodium carbonate and calcium carbonate are preferred.

The temperature range of the reaction is about −80° C. to about −25° C. The lowest temperature is limited only by the freezing point of the amine in solvent solution. If higher temperatures are used, the amount of undesirable amides and byproducts is increased as heretofore described.

The reaction is carried out in an organic solvent solution. Any organic solvent in which the amine is soluble may be used. However, it has been found that chlorinated hydrocarbons are particularly suitable. The preferred chlorinated hydrocarbon solvent is chloroform. Other chlorinated hydrocarbons and mixtures thereof are also suitable. The higher freezing points of long chain chlorinated hydrocarbons may limit the minimum reaction temperature to somewhat above −80° C. Solvents other than chlorinated hydrocarbons including various hydrocarbons and hydroxylic solvents may be used but are not as suitable. It appears that halocarbon radicals form easily and serve as free radical inhibitors, thus facilitating the formation of the desired amine oxide product.

The concentration of the teritary amine in the organic solvent solution may be in the range from about 0.1% to about 50% by weight depending on the solubility of the particular amine in the particular solvent used at the reaction temperature. The normal range is about 1.0% to about 20% amine by weight.

The tertiary amine in solvent solution is ozonized at a temperature in the range of −80° C. to about −25° C. The amount of ozone required is the theoretical requirement to about 35% in excess of the theoretical requirement. A 10% excess is generally preferred. Large excesses of ozone are detrimental to the purity of the product. Great excesses may cause attack on the alpha carbon atoms to produce undesirable oxidation products. The concentration of ozone may be varied between about 0.01% to about 15% ozone in a carrier gas such as oxygen. The rate of reaction is determined by the amount of ozone being absorbed by the amine solution. The amount absorbed is determined by the difference in amount of ozone entering the solution and the amount of ozone passing through the solution.

The ozone concentration in a gas stream is measured by bubbling the gas stream through 2% aqueous potassium iodide for a measured time, then acidifying the aqueous solution and titrating with standarized thiosulfate. Using the formula: $V \times N \times 24$ where V is the volume of the thiosulfate titrated and N is the normality of the thiosulfate solution, ozone is expressed as units per time unit. Ozone as a function of time may be combined with a measurement of flow rate determined by a flowmeter to give the percent composition.

The product anhydrous tertiary amine oxide, is recovered by evaporation of the solvent and when present the removal of the carbonate salts by filtration. If desired, the unreacted tertiary amine may be separated from the oxide and recycled if desired. The separated carbonate salts may also be reused as well as the solvent. In commercial production, an efficient and highly economical process results by incorporating solvent and carbonate salt recovery and recycle in the process.

The invention will be better understood with reference to the following examples which are illustrations of certain preferred embodiments of the present invention and are not intended to be limiting in any sense. Unless otherwise indicated, all parts and percentages used herein are by weight.

*Example 1*

Dimethyllaurylamine oxide was prepared by dissolving 18 parts dimethyllaurylamine in 100 parts of chloroform. The solution was placed in a reaction vessel equipped with a stirring means and a thermometer. The temperature of the solution was maintained at −78° C. While agitating the solution, a stream of ozone was passed through the solution at a concentration of 8% ozone in an oxygen carrier. The gas entered the solution through a porous dispersing means which produced finely divided bubbles. The ozone was bubbled through the solution until 1.1 mol of ozone per mol of amine had been absorbed. The amount of ozone absorbed was determined by measuring the concentration of ozone escaping past the solution and substracting from the known amount entering the solution.

Analysis of the product showed 63.6% dimethyllaurylamine oxide, 22.7% dimethyllaurylamine hydrochloride and traces of amide and carboxylic acids.

*Example 2*

Dimethyllaurylamine oxide was again prepared, however in this example calcium carbonate was used to reduce the amount of hydrochloride salt formed. A solution of 8 parts dimethyllaurylamine was dissolved in 100 parts of chloroform. This solution was placed in a 3-necked flask equipped with a Tru-bore stirrer. The temperature of the solution was reduced to −75° C. 4.0 parts of calcium carbonate were added to the solution. Ozone, at a concentration of 6% in an oxygen carrier, was passed through a porous dispersing means into the amine solution to produce finely divided bubbles. The amount of ozone absorbed was calculated by determining the amount of ozone passing through the solution. The reaction was terminated when 110% excess of ozone based on the molar equivalent of dimethyllaurylamine had been absorbed. The product was recovered from the solution by filtration to remove the calcium carbonate and evaporation of the solvent.

Analysis of the product showed 82.3% dimethyllaurylamine oxide and 16.3% dimethyllaurylamine hydrochloride.

This example illustrates the reduction in amount of amine hydrochloride salt formed with an increase in the amount of the preferred amine oxide being formed. The addition of the carbonate salt suppresses salt formation.

*Example 3*

A solution of amine in chloroform was prepared by dissolving 10 parts of dimethyllaurylamine in 90 parts of chloroform. The solution was placed in a reaction vessel similar to that of Example 1. The temperature of the solution was reduced to and maintained at −75° C. To this solution 4.2 parts of sodium carbonate was added. A stream of 8% ozone in an oxygen carrier was passed through the solution in finely dispersed form. The amount of ozone being absorbed by the solution was determined by difference of ozone entering the solution and ozone passing through the solution. Ozonization was continued until 1.1 mol of ozone was absorbed per mol of amine. The product was recovered from the solution by filtration and evaporation of the solvent.

The resulting product was analyzed and found to contain no amine hydrochloride, 63.7% amine oxide and 36% unreacted amine. The unreacted amine could be separated and further reacted to form amine oxide.

The significance of this example is almost complete conversion to amine oxide, the unconverted product being capable of recycle so as to obtain only the desired product.

*Example 4*

This example illustrates increasing the amount of ozone absorbed by the amine solution.

The solutions of Example 3 were again prepared using the same amount of sodium carbonate and the same percent ozone in the oxygen carrier. The amount of ozone absorbed by the solution was increased so that 1.35 mols of ozone were absorbed per mole of amine. This amount represents a 35% excess rather than the 10% excess of Example 3.

Analysis of the product showed 76.9% amine oxide, 10.5% amine hydrochloride salt and 12.6% unreacted amine.

It is thus evident that by increasing the percentage excess of ozone absorbed in the solution a higher conversion of amine oxide resulted, but the formation of the less desirable amine hydrochloride salt has also resulted. In many situations, the amine hydrochloride salt does not affect the product and it may be desirable to increase the yield of amine oxide per cycle of amine rather than recycle larger amounts of unreacted amine.

*Example 5*

This example illustrates the effect of increasing the temperature of reaction. The reaction was run without an addition of carbonate salts which would have, if added, reduced the amount of amine salt formed.

A solution was prepared containing 12 parts dimethyl-laurylamine in 82 parts of chloroform. The solution was placed in a reaction vessel similar to that of Example 1 and the temperature of the solution was reduced to $-15°$ C. The solution was agitated and a stream of finely dispersed gas, consisting of 6% ozone and the remainder oxygen carrier, was passed through the solution. When 1.1 mol of ozone per mol of amine had been absorbed in the solution, the reaction was terminated. The product was recovered by evaporating the chloroform.

Analysis of the product showed that it consisted of 41.5% dimethyllaurylamine oxide, 18% dimethyllaurylamine hydrochloride, 25% amide and 15.6% unreacted amine.

It is thus evident that the higher reaction temperature facilitates an attack on the alpha carbon atom to form amides in large amounts whereas at the lower preferred temperature ranges, the amides are not formed. It is also apparent that amine oxides can be formed at temperatures above the preferred range but the purity of the product is greatly limited.

*Example 6*

This example illustrates the formation of anhydrous diethylstearylamine oxide by the process of this invention.

A solution was prepared containing 2 parts of diethyl-stearylamine and a mixture of 50 parts chloroform and 50 parts methylene chloride. The solution was placed in a reaction vessel similar to that of Example 1 and the temperature of the solution was reduced to $-50°$ C. To this solution 2.2 parts of sodium carbonate was added. The solution was agitated and a gas composed of 6% ozone in an oxygen carrier was passed through the solution while agitating in a finely dispersed form. When 1.1 mol of ozone per mol of amine had been absorbed in the solution, the reaction was terminated. The product was recovered by filtration to remove carbonates and evaporation of the solvent.

Analysis of the product showed that it consisted of 65.2% diethylstearylamine oxide, 6.5% diethylstearylamine hydrochloride, 4.3% amide and 23% unreacted amine.

*Example 7*

Dimethylpalmitylamine oxide was formed by the process of this invention by reacting 5 parts of dimethyl-palmitylamine and 95 parts of chloroform, with ozone. The amine, in chloroform solution, was placed in a reaction vessel equipped with a stirring means and cooled to a temperature of $-75°$ C. To this solution 3.0 parts of sodium carbonate was added. While agitating the solution, ozone at a concentration of 8% in an oxygen carrier was passed through the solution. When 1.15 mols of ozone per mol of amine had been absorbed by the solution the reaction was terminated. The product was recovered by filtration and subsequent evaporation of the solvent.

Analysis of the product showed that it consisted of 73.5% dimethylpalmitylamine oxide and 26% unreacted amine. With the presence of the sodium carbonate salt, the formation of dimethylpalmitylamine hydrochloride salt was eliminated under the reaction conditions. The unreacted amine could be recycled for further reaction.

*Example 8*

This example illustrates the use of a non-chlorinated hydrocarbon as the solvent.

A solution of dimethyllaurylamine was made by dissolving 5 parts of amine in 95 parts of methanol. The solution was placed in a reaction vessel equipped with a stirring means and a thermometer. The temperature of the solution was reduced to $-75°$ C. and maintained at that temperature throughout the reaction. Ozone at a concentration of 6% in an oxygen carrier was passed through the agitated solution. The reaction was terminated when 1.1 mol of ozone per mol of amine had been absorbed by the solution. The product was recovered by evaporation of the solvent.

Analysis of the product showed that it consisted of 50.1% dimethyllaurylamine oxide and was contaminated with amides despite the low reaction temperature. This indicated that the chlorinated hydrocarbon solvents aid in the formation of the desired product. Although amine oxide can be formed under the conditions of this example, it is preferred to obtain a pure product which is not contaminated with amides.

*Example 9*

This example illustrates the use of still another solvent other than a chlorinated hydrocarbon.

A solution of dimethyllaurylamine was prepared by dissolving 5 parts of amine in 100 parts of ethyl acetate. The solution was placed in a reaction vessel similar to that of Example 8 and the temperature was reduced to $-75$- C. During the reaction the temperature was maintained at $-75°$ C. Ozone at a concentration of about 6% in an oxygen carrier was passed through the agitated solution until 1.1 mol of ozone had been absorbed per mol of amine. The product was recovered by evaporation of the solvent.

Analysis of the product showed that it consisted of 44.4% dimethyllaurylamine oxide and was contaminated with amides and carboxylic acids. The contaminants are apparently due to the unfavorable action of the solvent on the amine since under the reaction conditions using a chlorinated hydrocarbon solvent, amides and carboxylic acids are not formed.

The above examples have illustrated certain preferred embodiments of the present invention. The anhydrous mixed alkyl tertiary amine oxides formed by the process of this invention are particularly useful for surfactants as constituents in detergents and detergent compositions such ase shampoos and cleansing compounds. The straight chain mixed alkyl tertiary amine oxides are particularly useful in the production of soft detergents since they are considered to be bio-degradable.

I claim:

1. A process for the preparation of a mixed alkyl tertiary amine oxide, comprising reacting, at a temperature in the range of $-80°$ C. to $-25°$ C., ozone with a solution of a mixed alkyl tertiary amine in chlorinated hydrocarbon solvent containing a weak acid salt of an alkali metal or alkaline earth metal.

2. The process according to claim 1 wherein the concentration of said alkyl tertiary amine in said solution is in the range of 0.1% to 50% and the concentration of said weak acid salt in said solution is in the range of 0.8 to 1.5 mol equivalents based on said alkyl tertiary amine.

3. The process according to claim 1 wherein said solvent is chloroform.

4. The process according to claim 1 wherein said salt is an alkali metal carbonate.

5. The process according to claim 1 wherein said salt is an alkaline earth metal carbonate.

6. A process for the preparation of a mixed alkyl tertiary amine oxide having the formula

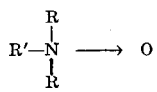

wherein R is a lower alkyl group and R' is an alkyl group containing 10 to 18 carbon atoms, comprising reacting ozone with a solution of a tertiary amine having the formula

wherein R and R' are as defined above, in a chlorinated hydrocarbon solvent containing a weak acid salt of an alkali metal or alkaline earth metal, said reaction being maintained at a temperature in the range of $-80°$ C to $-25°$ C.

7. A process for the preparation of dimethyllaurylamine oxide comprising reacting ozone with a solution having a concentration of 0.1% to about 50% of dimethyllaurylamine in chloroform, said solution maintained at a temperature in the range of about $-80°$ C. to $-25°$ C., and said solution containing about an equal molar equivalent to said amine of an alkali metal carbonate salt.

8. A process for the preparation of diethylstearylamine oxide comprising reacting ozone with a solution having a concentration of 0.1% to about 50% of diethylstearylamine in chloroform, said solution maintained at a temperature in the range of about $-80°$ C. to $-25°$ C., and said solution containing about an equal molar equivalent to said amine of an alkali metal carbonate salt.

9. A process for the preparation of dimethylpalimitylamine oxide comprising reacting ozone with a solution having a concentration of 0.1% to about 50% of dimethylpalmitylamine in chloroform, said solution maintained at a temperature in the range of about $-80°$ C to $-25°$ C., and said solution containing about an equal molar equivalent to said amine of an alkali metal carbonate salt.

References Cited

FOREIGN PATENTS 437,566  2/1935  Great Britain.

OTHER REFERENCES

Horner et al.: Chemische Berichte, vol. 91, No. 1, pp. 76 and 81 (1958).

CHARLES B. PARKER, *Primary Examiner.*

RICHARD L. RAYMOND, *Assistant Examiner.*